US009521602B2

(12) United States Patent
Xu et al.

(10) Patent No.: US 9,521,602 B2
(45) Date of Patent: Dec. 13, 2016

(54) METHOD AND APPARATUS FOR MANAGEMENT OF HIGH FREQUENCY COMMUNICATIONS IN A LOW FREQUENCY WIRELESS NETWORK

(71) Applicant: QUALCOMM Incorporated, San Diego, CA (US)

(72) Inventors: Hao Xu, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 14/454,467

(22) Filed: Aug. 7, 2014

(65) Prior Publication Data
US 2015/0043538 A1 Feb. 12, 2015

Related U.S. Application Data

(60) Provisional application No. 61/864,417, filed on Aug. 9, 2013.

(51) Int. Cl.
| H04W 4/00 | (2009.01) |
| H04W 36/16 | (2009.01) |
| H04W 36/00 | (2009.01) |
| H04W 76/02 | (2009.01) |
| H04W 72/04 | (2009.01) |
| H04W 36/04 | (2009.01) |
| H04W 16/32 | (2009.01) |

(52) U.S. Cl.
CPC ....... H04W 36/165 (2013.01); H04W 36/0033 (2013.01); H04W 72/0453 (2013.01); H04W 76/025 (2013.01); H04W 16/32 (2013.01); H04W 36/04 (2013.01)

(58) Field of Classification Search
CPC ........... H04L 2012/5608; H04W 84/12; H04W 88/08; H04W 80/04; H04W 88/06; H04W 84/18; H04W 36/30; H04W 36/24; H04W 52/40; H04W 36/165; H04W 36/0033; H04W 36/04; H04W 76/025; H04W 72/0453; H04B 7/0617; H04B 7/04
USPC ..... 370/310.2, 328, 331, 332, 334, 338, 349
See application file for complete search history.

(56) References Cited

U.S. PATENT DOCUMENTS

| 8,630,649 | B2* | 1/2014 | Jin ........................ H04W 36/34 370/331 |
| 8,965,375 | B2* | 2/2015 | Michel .......................... 370/331 |
| 2007/0280164 | A1* | 12/2007 | Hayashi .............. H04W 72/048 370/331 |
| 2009/0029710 | A1* | 1/2009 | Ochiai .................... H04L 5/023 455/450 |
| 2009/0163208 | A1* | 6/2009 | Rao ........................ H04W 36/06 455/436 |
| 2012/0028588 | A1* | 2/2012 | Morioka .............. H04B 7/0617 455/71 |

(Continued)

Primary Examiner — Brenda H Pham
(74) Attorney, Agent, or Firm — Norton Rose Fulbright US LLP

(57) ABSTRACT

Wireless communication systems and methods are described where communication is established with a user device at a low frequency. Coarse channel information, such as pathloss, power delay profile, and multipath direction information, regarding the communication between a wireless network device and the user device at the low frequency may then be used to establish communication with the user device at a high frequency.

30 Claims, 8 Drawing Sheets

(56) References Cited

U.S. PATENT DOCUMENTS

2014/0045505 A1* 2/2014 Henry ............... H04W 36/0061
455/444

* cited by examiner

METHOD AND APPARATUS FOR MANAGEMENT OF HIGH FREQUENCY COMMUNICATIONS IN A LOW FREQUENCY WIRELESS NETWORK

CROSS REFERENCE TO RELATED APPLICATIONS

The present application claims priority to U.S. Provisional Patent Application No. 61/864,417, entitled "METHOD AND APPARATUS FOR MANAGEMENT OF HIGH FREQUENCY COMMUNICATIONS IN A LOW FREQUENCY WIRELESS NETWORK," filed Aug. 9, 2013, the disclosure of which is hereby incorporated herein by reference.

BACKGROUND

Field

Aspects of the present disclosure relate generally to wireless communication systems, and more particularly, to managing high frequency communications in a low frequency wireless network.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

In general, wireless communications networks implement the aforementioned uplink and downlink communications between base stations and UEs using a low frequency carrier signal (e.g. 400 MHz-3 GHz). For example, current 3G networks utilize 850, 1700, 1900 and 2100 MHz frequencies and current 4G technologies utilize 700, 800, 1700, 1900, 2100 and 2500 MHz frequencies. Low frequency carrier signals provide certain advantages which have assisted with the widespread deployment of wireless networks. Such frequencies provide for a balance of coverage area range capabilities and the ability to handle a large number of UEs.

It is generally understood that the higher the frequency utilized, the smaller the available coverage area becomes. This is true even within the range of low frequency networks (e.g. 1900 MHz transmissions generally do not cover as much distance as an 800 MHz transmission). Further, it is understood that use of the higher end of the low frequency range, such as 1900 MHz, allows for higher bandwidth and the ability to provide service to more UEs.

Wireless communication networks generally do not utilize frequencies in a much higher range, e.g. 20 GHz-60 GHz because such high frequency signals would suffer multiple drawbacks if they were to be deployed in a wireless communication network setting. For example, at a frequency of 28 GHz, the free space path loss of a signal is 20 dB larger than with a 2 GHz signal. Oxygen absorption and other atmospheric conditions (e.g. presence of rain, water vapor and the like) also impact high frequency signals more adversely. Penetration loss is also much larger at high frequencies when a signal encounters buildings, foliage, etc.

Further, communication at high frequencies often requires line of sight (LOS) connections. This raises multiple technical challenges for maintaining communications between a base station and a UE, especially in an environment where the UE is mobile. Because of this, high frequency communications are not utilized in wireless communications networks.

SUMMARY

In one aspect of the disclosure, a method of wireless communication includes establishing, by at least one wireless network device, communication with a user device at a low frequency, identifying coarse channel properties related to the communication between the at least one wireless network device and the user device at the low frequency, and establishing, by the at least one wireless network device, communication with the user device at a high frequency based, at least in part, on the coarse channel properties of communication at the low frequency.

In an additional aspect of the disclosure, a method of wireless communication includes receiving, at a first network device, coarse channel properties from a second network device corresponding to one or more channel properties of a low frequency communication between the second network device and a user device, and establishing high frequency communications, by the first network device, with the user device based, at least in part, on the received coarse channel properties related to the low frequency communication.

In an additional aspect of the disclosure, a method of wireless communication includes communicating, by a user device, with at least one network device at a low frequency, and receiving, at the user device, a high frequency communication directed to the user device based on coarse channel properties associated with the communicating at the low frequency.

In an additional aspect of the disclosure, an apparatus configured for wireless communication includes means for establishing, by at least one wireless network device, communication with a user device at a low frequency, means for identifying coarse channel properties related to the communication between the at least one wireless network device and the user device at the low frequency, and means for establishing, by the at least one wireless network device, communication with the user device at a high frequency based, at least in part, on the coarse channel properties of communication at the low frequency.

In an additional aspect of the disclosure, an apparatus configured for wireless communication includes means for receiving, at a first network device, coarse channel properties from a second network device corresponding to one or more channel properties of a low frequency communication between the second network device and a user device, and means for establishing high frequency communications, by the first network device, with the user device based, at least in part, on the received coarse channel properties related to the low frequency communication.

In an additional aspect of the disclosure, an apparatus configured for wireless communication includes means for communicating, by a user device, with at least one network device at a low frequency, and means for receiving, at the user device, a high frequency communication directed to the user device based on coarse channel properties associated with the means for communicating at the low frequency.

In an additional aspect of the disclosure, an apparatus includes at least one processor and a memory coupled to the processor. The processor is configured to establish, by at least one wireless network device, communication with a user device at a low frequency, to identify coarse channel properties related to the communication between the at least one wireless network device and the user device at the low frequency, and to establish, by the at least one wireless network device, communication with the user device at a high frequency based, at least in part, on the coarse channel properties of communication at the low frequency, and a memory coupled to the processor.

In an additional aspect of the disclosure, an apparatus includes at least one processor and a memory coupled to the processor. The processor is configured to receive, at a first network device, coarse channel properties from a second network device corresponding to one or more channel properties of a low frequency communication between the second network device and a user device, and to establish high frequency communications, by the first network device, with the user device based, at least in part, on the received coarse channel properties related to the low frequency communication, and a memory coupled to the processor.

In an additional aspect of the disclosure, an apparatus includes at least one processor and a memory coupled to the processor. The processor is configured to communicate, by a user device, with at least one network device at a low frequency, and to receive, at the user device, a high frequency communication directed to the user device based on coarse channel properties associated with the communication at the low frequency, and a memory coupled to the processor.

In an additional aspect of the disclosure, a computer program product has a computer-readable medium having program code recorded thereon. This program code includes code for causing a computer to establish, by at least one wireless network device, communication with a user device at a low frequency, code to identify coarse channel properties related to the communication between the at least one wireless network device and the user device at the low frequency, and code to establish, by the at least one wireless network device, communication with the user device at a high frequency based, at least in part, on the coarse channel properties of communication at the low frequency, and a memory coupled to the processor.

In an additional aspect of the disclosure, a computer program product has a computer-readable medium having program code recorded thereon. This program code includes code for causing a computer to receive, at a first network device, coarse channel properties from a second network device corresponding to one or more channel properties of a low frequency communication between the second network device and a user device, and code to establish high frequency communications, by the first network device, with the user device based, at least in part, on the received coarse channel properties related to the low frequency communication, and a memory coupled to the processor.

In an additional aspect of the disclosure, a computer program product has a computer-readable medium having program code recorded thereon. This program code includes code for causing a computer to communicate, by a user device, with at least one network device at a low frequency, and code to receive, at the user device, a high frequency communication directed to the user device based on coarse channel properties associated with the communication at the low frequency, and a memory coupled to the processor.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (WiFi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
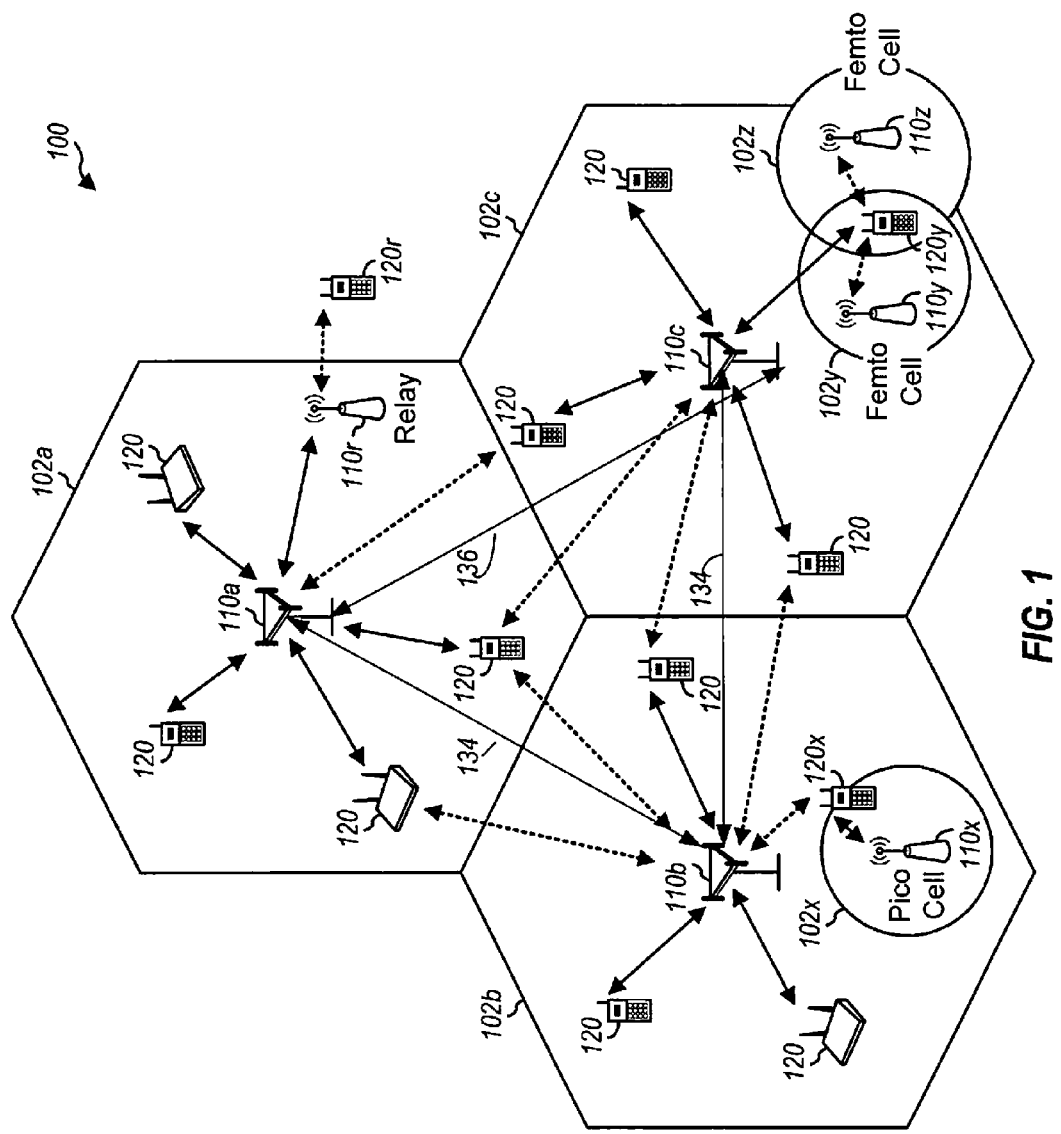
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
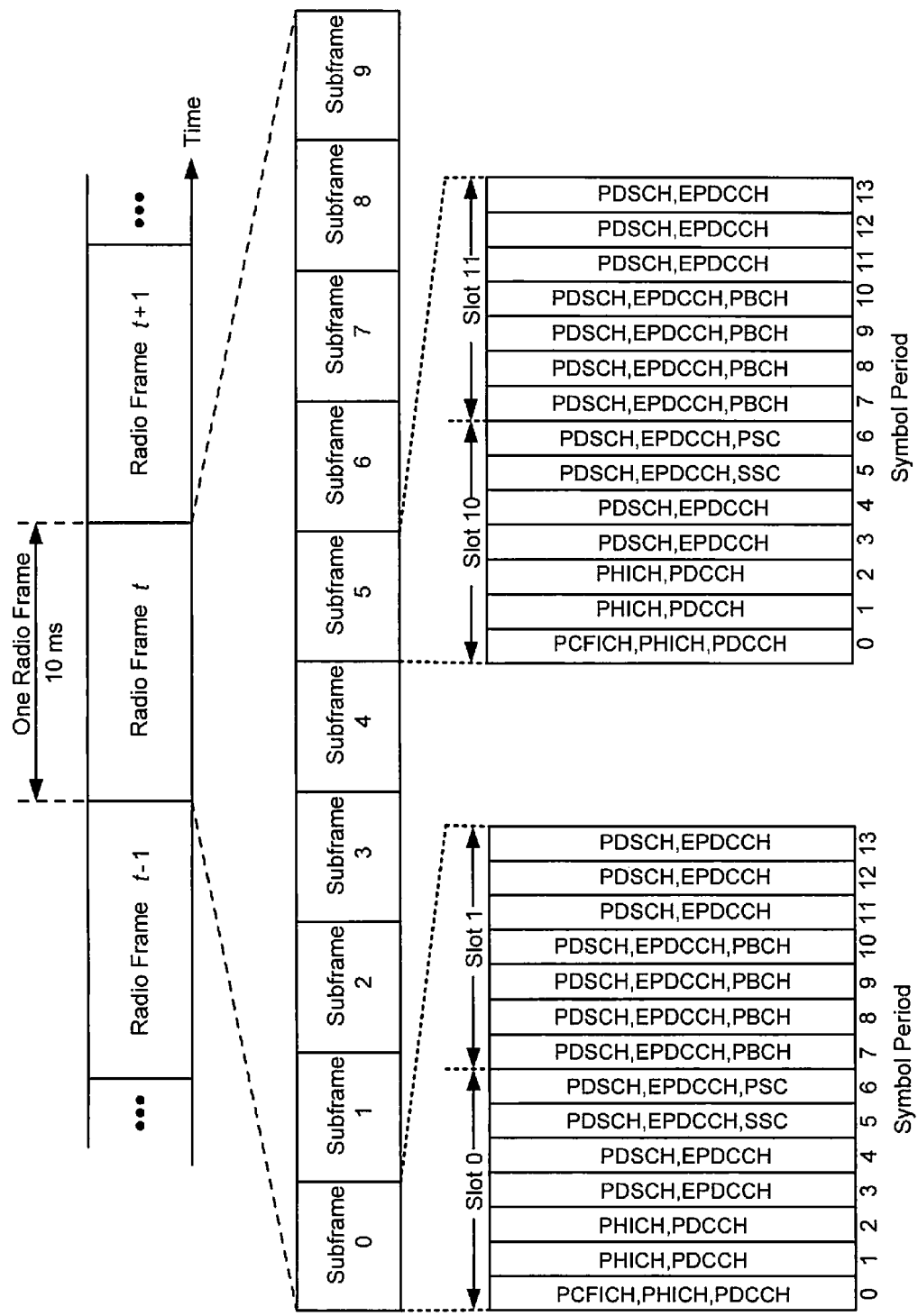
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Enhanced-Physical Downlink Control Channel (EPDCCH) is included in the later symbol periods of each subframe. The EPDCCH is a new type of control channel. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
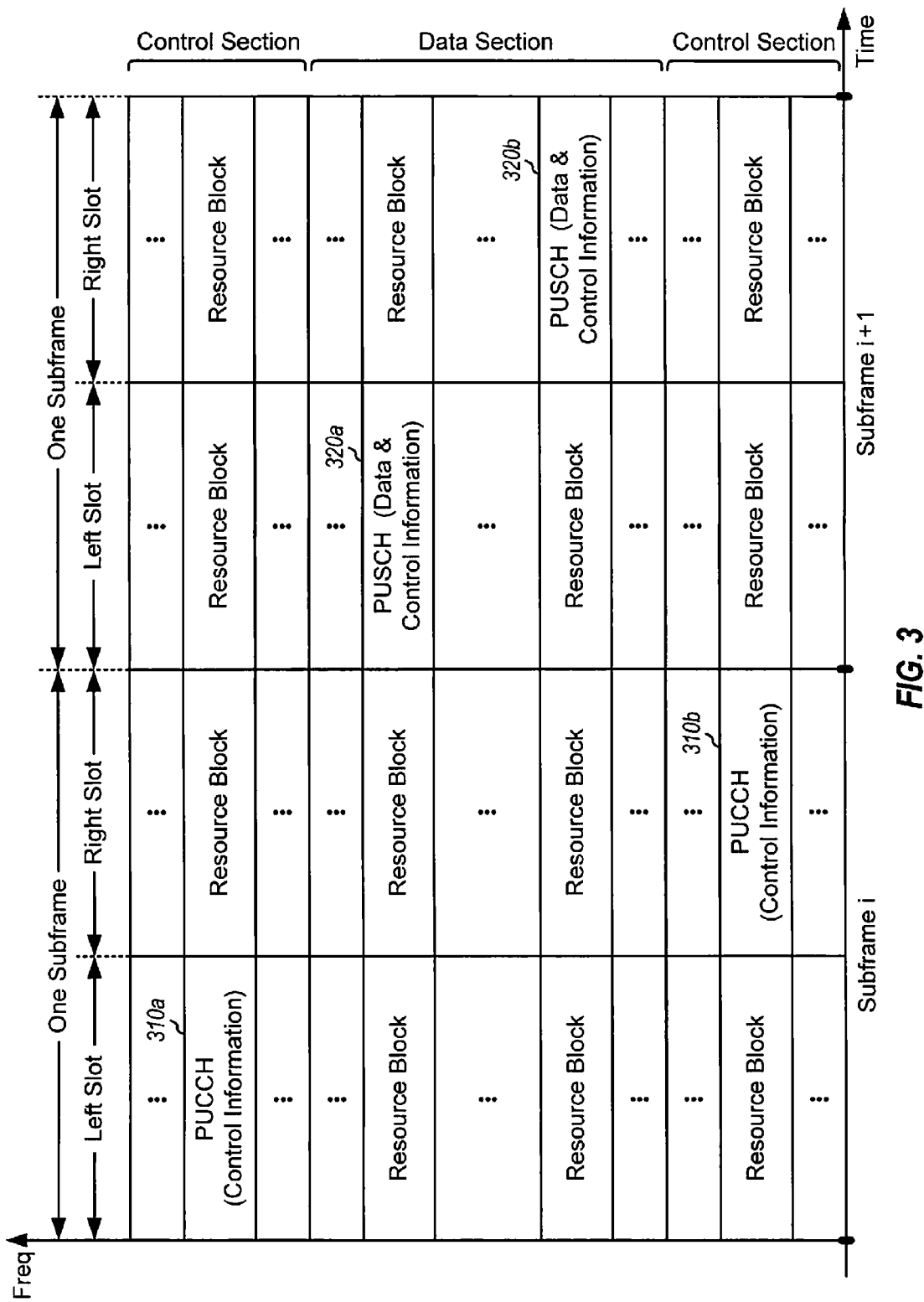
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe may be statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
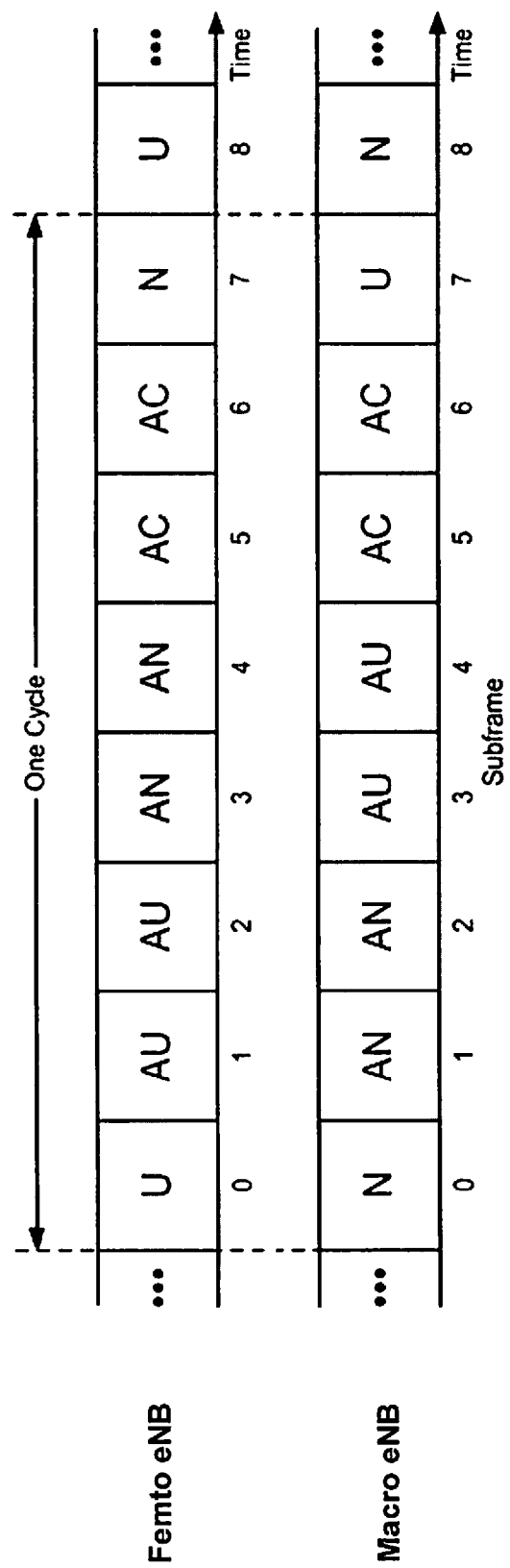
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km 3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
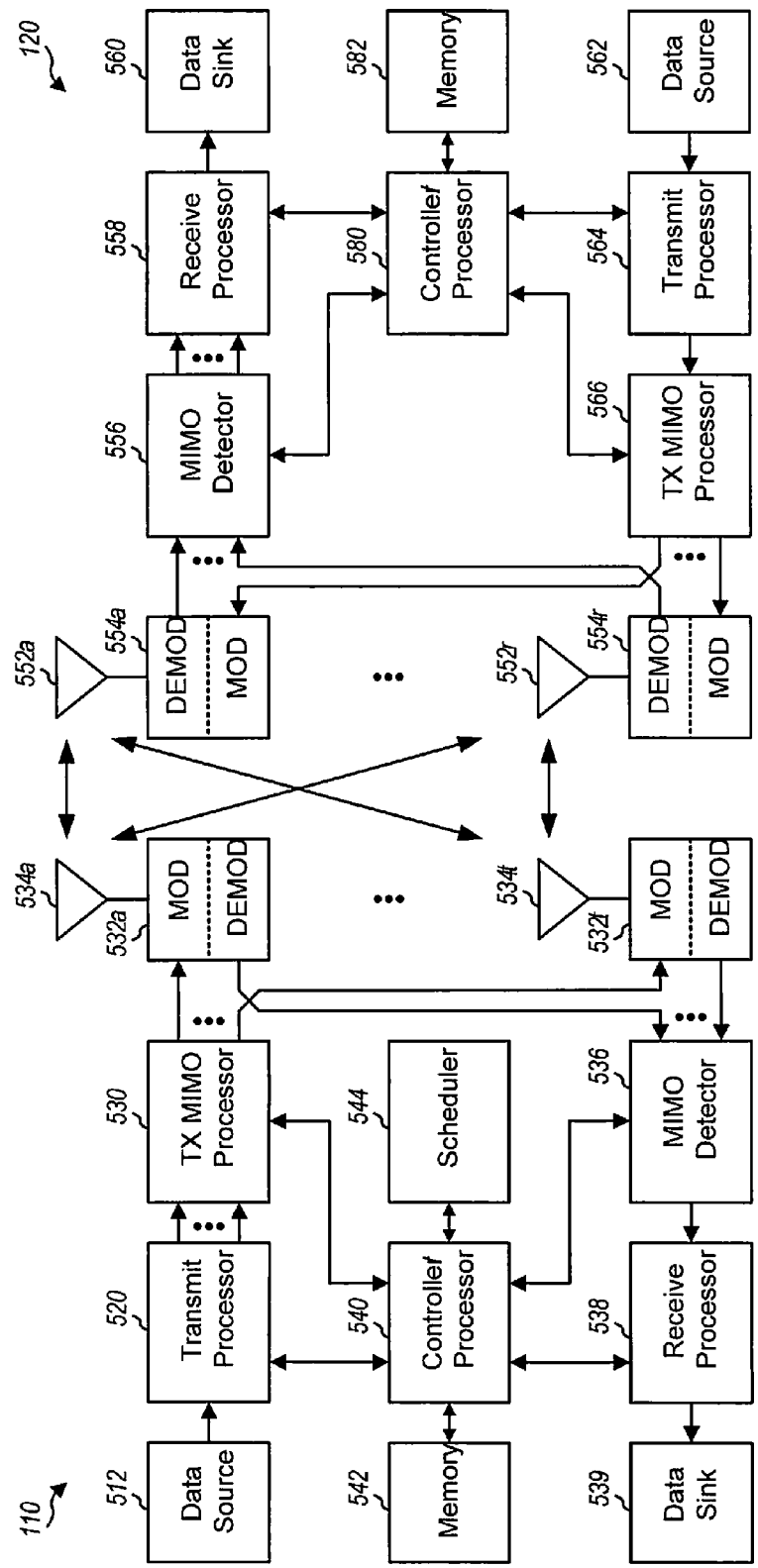
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 7-9, and/or other processes for the techniques described herein. The memories 542 and 582 may store data and program codes for the eNB 110 and the UE 120, respectively. A scheduler 544 may schedule UEs for data transmission on the downlink and/or uplink.

Figure 6:
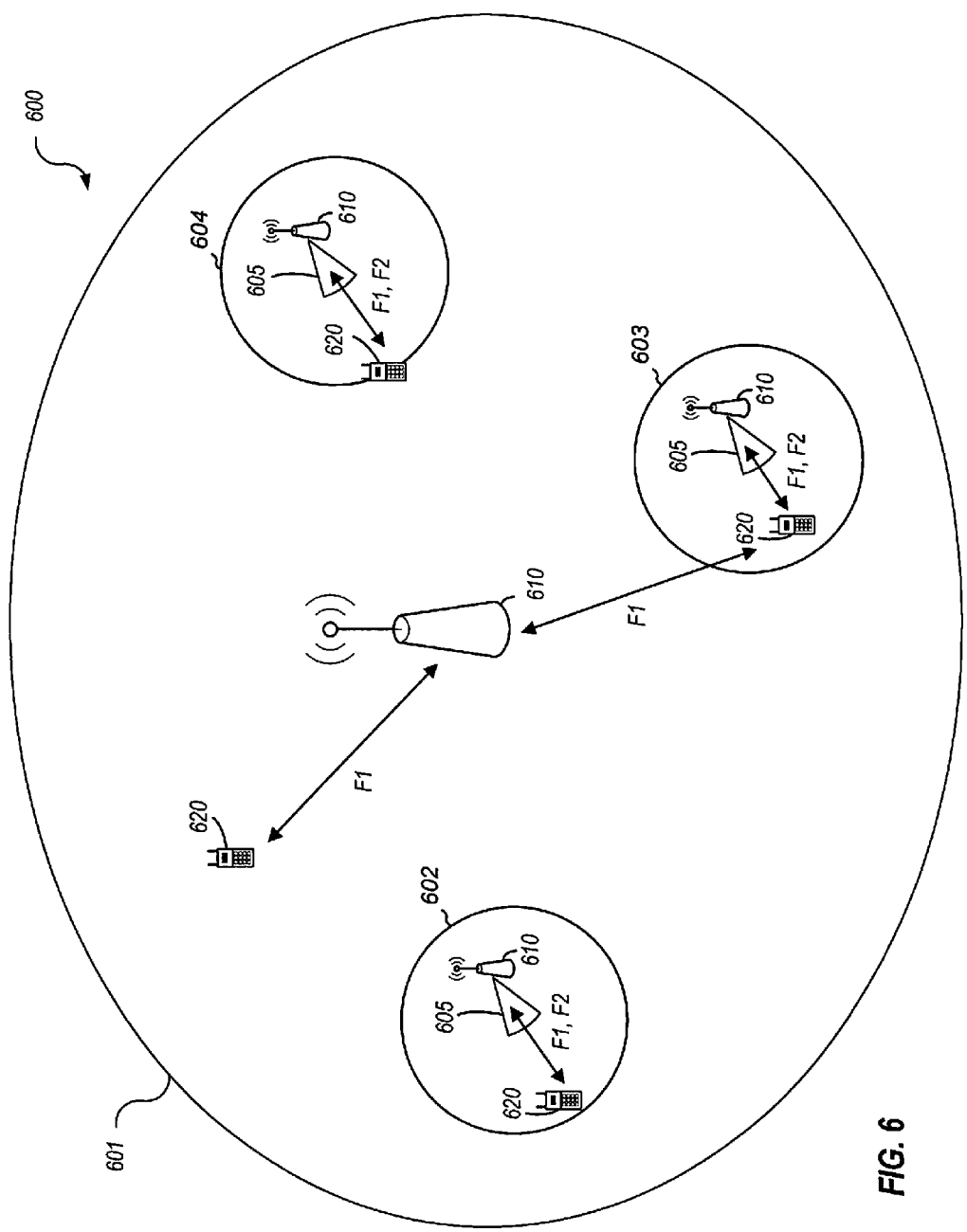
FIG. 6 is block diagram conceptually illustrating an example of a telecommunications system.

FIG. 6 shows a wireless network 600 for communication in accordance with various aspects. Network 600 includes a multiple eNBs 610. Each eNB 610 may provide communication coverage for a particular geographic area, for example, macro cell 601 and multiple small cells 602-604 are provided. It is noted that macro cell 601 may be implemented with the functionality described above with respect to eNB 110 and small cells 602-604 may be implemented as pico cells, femto cells and/or other types of cells as discussed above with respect the system of FIG. 1.

The UEs 620 are dispersed throughout the wireless network 600, and each UE may be stationary or mobile. As with UE 120, UE 620 may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may have varying capabilities and in some cases may be able to communicate with macro eNBs, and small cell eNBs. In some cases, UEs may be able to utilize multiple eNBs simultaneously and may be able to communicate using both low frequency carrier signals and high frequency carrier signals either separately or simultaneously.

Communication paths between UEs 620 and eNBs 610 are shown as solid line with double arrows. These paths are also labeled with F1 and/or F2 which connote different carrier signal communication frequencies. In the illustrated aspect F1 represents a low frequency (e.g. 400 MHz-3 GHz) and F2 represents a high frequency (e.g. 20 GHz-60 GHz).

In accordance with one aspect small cell 602 supports communications at both frequencies F1 and F2 and is in communication with a UE 620 which also supports F1 and F2. In this case, UE 620 of small cell 602 may be configured to transmit and/or receive control and/or channel information with eNB 610 of small cell 602 at F1, while data transmissions are exchanged at F2. Channel information may include any information that may be used to assist the connection of UE 620 and eNB of small cell 602 both for establishing and maintaining the connection. For example, channel information may include coarse channel properties from the communication at F1 which may be used to establish communications at F2. Coarse channel properties may include path loss information, delay profile information, line of sight (LOS) information, information regarding multipath signals and the like. eNBs 610 may also be able to independently determine such coarse channel properties through measurements of various transmissions received from UE 620. Such information may be utilized to determine the location of UE 620 in order to better direct/steer beam 605 (which conveys the transmission at F2) toward UE 620 and to otherwise fine tune a connection at F2.

Coarse channel properties may further include properties which allow for angle of arrival (AOA) and angle of departure (AOD) values to be determined. For example, uplink signal and/or channel feedback information may be utilized to derive AOA/AOD. Such values may also be used for coarse initial beam alignment of beam 605.

Communication of various channel or control data at F1 may also be utilized to implement RACH procedures and connection setup, mobility support with radio link monitoring (RLM), radio resource monitoring (RRM), paging, and other control signaling. Additionally, communications at F1, either between UE 620 or macro eNB 610, may be utilized to facilitate dormancy control of eNBs of the small cells.

It is appreciated that at high frequencies the beam width of highly dimensional arrays is on the order of a few degrees. Accordingly, utilizing the control communications between a UE and eNB at F1, sufficient data may be obtained to steer beam 620 in order to establish a high frequency connection at F2. Moreover, channel information, including the coarse channel properties, may be provided to UE 620 to instruct the UE regarding one or more of beam direction of outgoing transmissions and/or beam width at F2, channel configuration information for downlink measurements at F2, and channel configuration information for the uplink channel at F2. Once the connection is established, data may be transferred between UE 620 and eNB 610 at a much faster rate.

After establishing the connection at F2, UE 620 and eNB 610 of small cell 602 may continue to exchange and/or identify channel information, including coarse channel properties, using the connection at F1 in many ways. For example, the various channel data and properties exchanged and/or identified may be continually sustained in order to maintain the connection at F2 when changes in the environment have occurred, such as due to motion of UE 620. Further, the connection at F1 may be utilized to exchange data in parallel with the data exchange occurring at F2 in order to provide for additional bandwidth.

In accordance with another aspect, small cell 603 may support communications with UE 620 only at high frequency F2. UE 620 also communicates with macro eNB 610 at F1. In this aspect UE 620 of small cell 603 may be configured to transmit and/or receive control information (e.g., including the coarse channel properties described above with respect to small cell 602) with macro eNB 610 at F1, while data transmissions are exchanged with eNB 610 of small cell 603 at F2.

In this aspect, channel and control data and properties identified by macro eNB 610 may deliver information, e.g., over a backhaul connection, which may be utilized to assist directing beam 605 of small cell 603 and may provide other relevant data such as selected user information, channel configuration information for the uplink and/or downlink channel at F2, and the like. Macro eNB 610 may communicate such data to small cell eNB 603 in order to establish communications with UE 620 at F2. Once the communication link at F2 is established, the control data communications between macro eNB 610 may continue and the communication link at F1. Such a link may be utilized to provide for additional beam steering within small cell 603 and may be utilized to implement handoff functionality when UE 620 leaves small cell 603. Additionally, the F1 communication link may also be utilized to provide additional data communication capability along with the F2 communication link.

Alternatively, once the communication link at F2 is established, the control data communications may be handed off to eNB 610 of small cell 603 and may be implemented at F2. In this case, the control data may utilized in a manner that it continues to assist eNB 610 of small cell 603 with directing the beam to maintain communications at F2.

In yet another aspect, small cell 604 may be configured to support communications at both frequencies F1 and F2 and is in communication with a UE 620 which also supports F1 and F2. In this case UE 620 of small cell 604 may be configured to transmit and/or receive channel information, including coarse channel properties, with eNB 610 of small cell 602 at F1 in order to establish a connection at F2 (e.g., as described above). Once the connection at F2 is established, the communications at F1 are handed off to the F2 communication link and the communications at F1 cease. Therefore, control data is exchanged at F2 along with user data which assists in maintaining the connection, steering beam 605, and the like.

It is appreciated that various modifications of the systems described in FIG. 6 may be made which are contemplated as being aspects of the present application. For example, in some cases macro eNB 610 may be configured to utilize a high frequency communication signal in a smaller area than area 601, while also acting as a macro eNB which services other small eNBs, micro eNBs, femto eNBs, etc. In such a circumstance, the use of signaling at F1 and F2 may be implemented as described with respect to small cells 602-604.

Moreover, aspects may utilize various connections at F1 and F2 and/or knowledge of these connections for implementing interference coordination/mitigation. The use of separate signals may itself provide for some interference advantages. Further, in cases where macro cells maintain communications at F1, central coordination of interference avoidance may be implemented in a communication network.

Additionally, while various terms such as high frequency, low frequency and various ranges of frequencies have been named, it is appreciated that the concepts disclosed herein which utilize a lower frequency signal to assist in establishing a high frequency connection are more generally applicable. For example, a low frequency signal may originate from other sources such as WiFi, WCDMA, and the like. In such a circumstance, a base station may support WiFi and a higher frequency transmission connection. Such a station may activate/establish the higher frequency transmission connection utilizing the lower WiFi connection.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
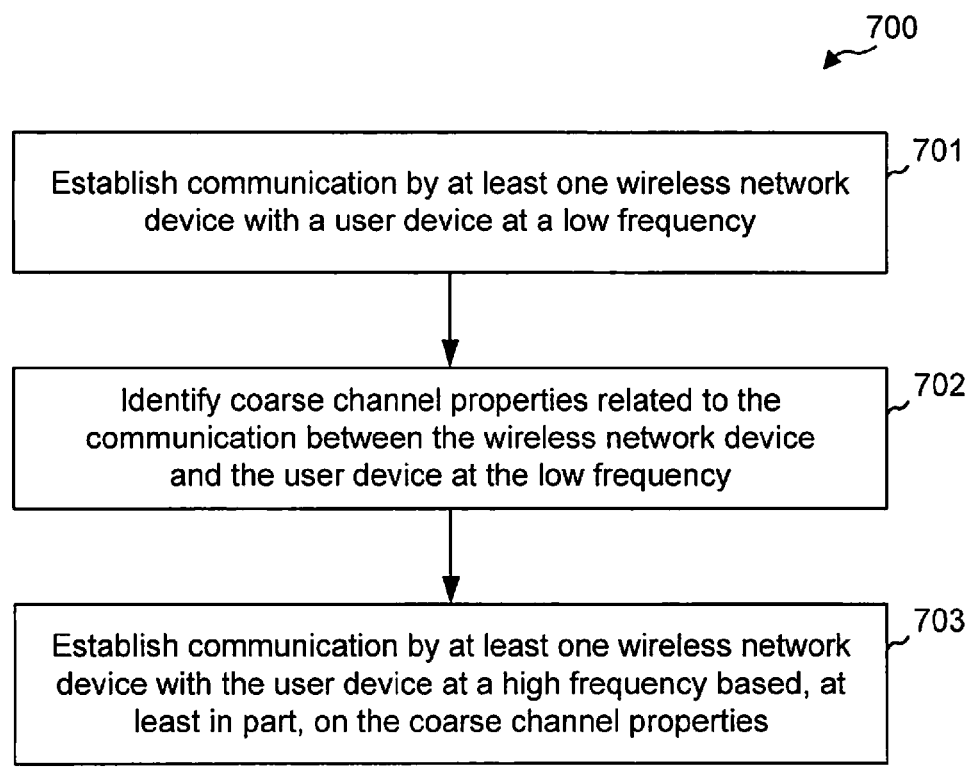
FIG. 7 is a functional block diagram illustrating example blocks executed to implement one aspect of the present disclosure.

In accordance with one or more aspects of the aspects described herein, with reference to FIG. 7, there is shown a methodology 700, operable by a network device for implementing wireless communications. Method 700 may include, at 701, establishing, by at least one wireless network device, communication with a user device at a low frequency. Additionally, method 700 may include, at 702, identifying coarse channel properties associated with the low frequency communication between the wireless network device and the user device. These coarse channel properties may be received in transmissions from the user device, determined by the network device, or a combination of both. Based on the coarse channel properties associated with the low frequency communication, method 700 may include at 703, establishing, by the at least one wireless network device, communication with the user device at a high frequency. As noted above, the coarse channel properties may include information and properties, such as beamforming and pathloss information that may trigger establishment of the high frequency communication link.

In related aspects, depending on the communication systems being used, the established communications at a low frequency may be at frequencies ranges such as the range between 0.4-2.5 GHz or 0.4-6.0 GHz. The low frequency range of 0.4-2.5 GHz generally encompasses the current cellular band. In such communication systems, high frequency communications may be considered at frequencies above 2.5 GHz. This range for high frequency may include unlicensed spectrum, such as 5.8 GHz, which, if used as additional bands for communication, would build on top of the cellular licensed band. If the low frequency range includes between 0.4-6.0 GHz, the high frequency communication range would be at frequencies over 6.0 GHz. Such frequencies between 2.5 GHz and 6.0 GHz, while considered high frequency in some aspects, typically experience less dependency on beamforming for communication and, thus, could be included in the low frequency range for various aspects of the present disclosure. In general, then, some aspects of the present disclosure may define low frequency between the range of 0.4-2.5 GHz, while other aspects may define low frequency between the range of 0.4-6.0 GHz. Depending on the designated low frequency ranges, the corresponding high frequency ranges may, in general, fall between the narrower range of 20-60 GHz or the broader range of 6.0-90 GHz. Therefore, in some aspects of the present disclosure, the coarse channel properties associated with the low frequency communications, which may be associated with licensed spectrum, would be applied for establishing high frequency communication in either licensed or unlicensed spectrum, while in other aspects, low frequency communications, which may be associated with unlicensed spectrum, may result in coarse channel properties associated with unlicensed spectrum being used to establish high frequency communications in either licensed or unlicensed spectrum, as the case may be.

Additionally, the network device which establishes the communication at the low frequency may be the same network device which establishes the communications at the high frequency (e.g. eNBs 610 of small cells 602 and 604). Alternatively, the network device which establishes the communication at the low frequency and high frequency may be different (e.g. as implemented with macro eNB 610 and small cell eNB 610 of 603). The coarse channel properties may include information, data, or properties relating to path loss, power delay profile, multipath direction, angle of arrival, and angle of departure information, as well as other location information. With such information, aspects may direct a high frequency transmission beam based on the coarse channel properties identified for the low frequency communication.

In another related aspect method 700 may further include monitoring, by the at least one network device in communication with the user device at the low frequency, whether the user device is in range of a second network device which is configured to communicate with the user device at the high frequency and/or activating the second network device when the user device is in range of the second network device.

It is further appreciated that method 700 may be carried out by various hardware devices such as eNBs 110 and 610 described above. Accordingly, such hardware may also be considered a means for establishing communication with a user device at a low frequency, receiving coarse channel properties for the communication between the wireless network device and the user device at the low frequency, and establishing communication with the user device at a high frequency based on the coarse channel properties received at the low frequency.

Figure 8:
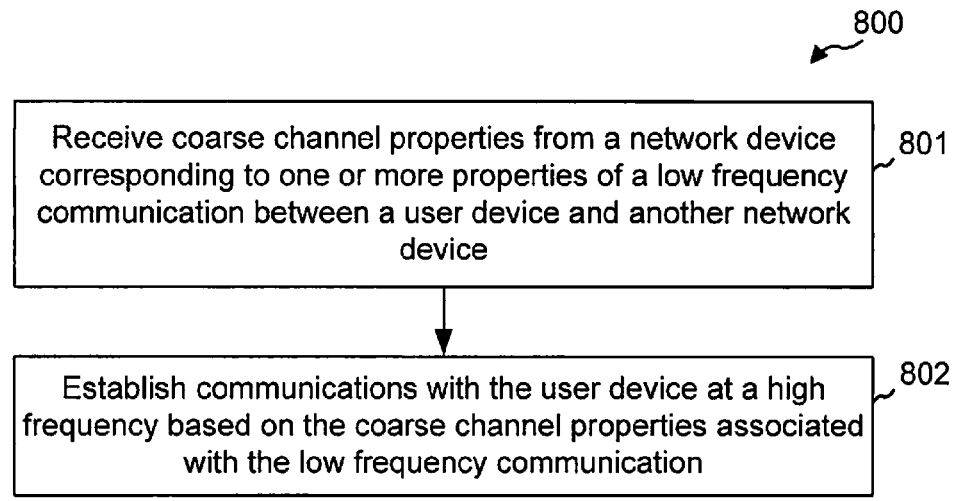
FIG. 8 is a functional block diagram illustrating example blocks executed to implement one aspect of the present disclosure.

In accordance with one or more aspects of the aspects described herein, with reference to FIG. 8, there is shown a methodology 800, operable by a first network device, for implementing wireless communications. Method 800 may include, at 801, receiving coarse channel properties from a second network device corresponding to one or more properties of a low frequency communication between a user device and the second network device. Additionally, method 800 may include, at 802, establishing communications by the first network device with the user device at a high frequency based on the coarse channel properties related to the low frequency communication between the user device and the second network device.

In related aspects, the established communications at a low frequency may be at frequencies such as between 0.4-6.0 GHz or 0.4-2.5 GHz, and a high frequency may be at frequencies such as between 6.0-90 GHz or 20-60 GHz, as noted above. Additionally, the coarse channel properties may include control or channel information such as information relating to path loss, power delay profile, multipath direction, angle of arrival, angle of departure information and other location information. With such information, aspects may direct a high frequency transmission beam based on the coarse channel properties associated with the low frequency communication.

It is further appreciated that method 800 may be carried out by various hardware devices such as eNBs 110 and 610 described above. Accordingly, such hardware may also be considered a means for receiving information from network device corresponding to one or more properties of a user device, said information received as part of a low frequency communication and establishing communications with the user device at a high frequency based on the information received at the low frequency.

Figure 9:
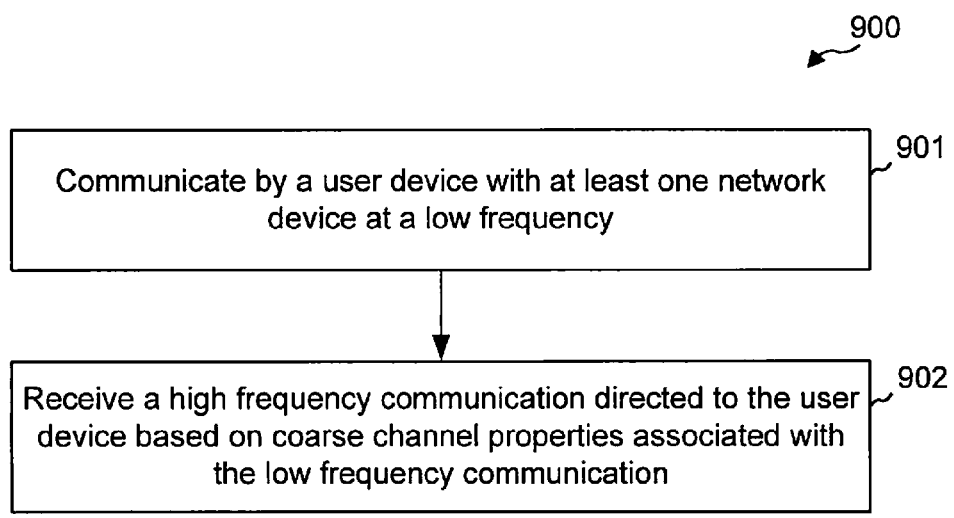
FIG. 9 is a functional block diagram illustrating example blocks executed to implement one aspect of the present disclosure.

In accordance with one or more aspects of the aspects described herein, with reference to FIG. 9, there is shown a methodology 900, operable by a user device, such as a UE, for implementing wireless communications. Method 900 may include, at 901, communicating, by a user device, with at least one network device at a low frequency. Additionally, method 900 may include, at 902, receiving a high frequency communication directed to the user device based on coarse channel properties associated with the communicating at the low frequency. The coarse channel properties may be communicated by the user device to the network device over the low frequency communication. Alternatively, the network device may determine some or all of the coarse channel properties through analysis of the low frequency communication with the user device.

In related aspects, the communications at a low frequency may be at frequencies such as between 0.4-6.0 GHz or 0.4-2.5 GHz, and a high frequency may be at frequencies such as between 6.0-90 GHz or 20-60 GHz, as noted above. Additionally, information received may include control or channel information such as information relating to path loss, power delay profile, multipath direction, angle of arrival, angle of departure information and other location information. With such information, aspects may direct a high frequency transmission beam based on the information received exchanged at the low frequency.

In additional aspects, the user device may provide the information to a first network device and the high frequency transmission may be received from the first network device. Alternatively, the high frequency transmission may be received from a second network device.

It is further appreciated that method 900 may be carried out by various hardware devices such as UEs 120 and 620 described above. Accordingly, such hardware may also be considered a means for providing information to at least one network device at a low frequency, and receiving a high frequency transmission in response to the information provided to the network device at the low frequency.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:

establishing, by at least one wireless network device, communication with a user device at a low frequency;

identifying, by the at least one wireless network device, coarse channel properties related to the communication between the at least one wireless network device and the user device at the low frequency;

establishing, by the at least one wireless network device, communication with the user device at a high frequency by utilizing the coarse channel properties related to communication at the low frequency to steer a beam that conveys the communication at the high frequency toward the user device; and maintaining the communication at the high frequency by continuing the communication at the low frequency to obtain the related coarse channel properties to tune the communication at the high frequency in response to environmental changes.

2. The method of claim 1, wherein the low frequency includes at least one of licensed or unlicensed spectrum;
wherein high frequency includes at least one of licensed spectrum or unlicensed spectrum; and
wherein the coarse channel properties related to the licensed spectrum of the low frequency are used in the establishing communication at the high frequency.

3. The method of claim 1, wherein the coarse channel properties include at least one of path loss, power delay profile, multipath direction, angle of arrival, angle of departure information, or location information regarding a location of the user device with respect to the at least one wireless network device.

4. The method of claim 1, further including monitoring, by the at least one wireless network device in communication with the user device at the low frequency, whether the user device is in range of a second network device which is configured to communicate with the user device at the high frequency.

5. The method of claim 4, further including activating the second network device when the user device is in range of the second network device.

6. The method of claim 5, further including providing, by the at least one wireless network device, the coarse channel properties to the second network device for establishing high frequency communication with the user device.

7. The method of claim 1, further including transmitting information corresponding to one or more high frequency communication network devices to the user device.

8. The method of claim 1, further including directing a high frequency transmission beam based on the coarse channel properties identified with regard to the communication at the low frequency.

9. The method of claim 1, wherein the coarse channel properties are identified in accordance with one or more of: transmissions received from the user device, or an independent determination by the at least one wireless network.

10. A method of wireless communication, comprising:
communicating, by a user device, with at least one network device at a low frequency; and
receiving, at the user device, a high frequency communication directed to the user device from the at least one network device based on coarse channel properties associated with the communicating at the low frequency,
wherein the coarse channel properties associated with the communicating at the low frequency are utilized to steer a beam that conveys the high frequency communication toward the user device, wherein the high frequency communication is maintained based on the coarse channel properties associated with the communicating at the low frequency that are continually obtained from the communicating at the low frequency to tune the high frequency communication in response to environmental changes.

11. The method of claim 10, wherein the low frequency includes at least one of licensed spectrum or unsilenced spectrum;
wherein high frequency includes at least one of licensed spectrum or unlicensed spectrum; and
wherein the coarse channel properties associated with the licensed spectrum of the low frequency are used in a direction of the high frequency communication to the user device.

12. The method of claim 10, wherein the communicating by the user device with the at least one network device includes communicating the coarse channel properties to the at least one network device.

13. The method of claim 10, wherein the coarse channel properties include at least one of: path loss, power delay profile, multipath direction, angle of arrival, angle of departure information, or location information regarding a location of the user device with respect to the at least one network device.

14. The method of claim 10, further including receiving a second high frequency communication from a second network device different from the at least one network device.

15. The method of claim 14, further including:
transmitting and receiving, by the user device, control information with the at least one network device at the low frequency; and
transmitting and receiving, by the user device, data information with the second network device with the high frequency communication.

16. An apparatus for wireless communication, comprising:
at least one processor configured to:
establish communication by at least one wireless network device with a user device at a low frequency;
identify by the at least one wireless network device coarse channel properties related to the communication between the at least one wireless network device and the user device at the low frequency;
establish by the at least one wireless network device communication with the user device at a high frequency by utilizing the coarse channel properties of the communication at the low frequency to steer a beam that conveys the communication at the high frequency toward the user device; and
maintain the communication at the high frequency by continuing the communication at the low frequency to obtain the related coarse channel properties to tune the communication at the high frequency in response to environmental changes;
a memory coupled to the at least one processor.

17. The apparatus of claim 16, wherein the low frequency includes at least one of licensed spectrum or unlicensed spectrum;
wherein high frequency includes at least one of licensed spectrum or unlicensed spectrum; and
wherein the coarse channel properties related to the licensed spectrum of the low frequency are used in the configuration of the at least one processor to establish communication at the high frequency.

18. The apparatus of claim 16, wherein the coarse channel properties include at least one of path loss, power delay profile, multipath direction, angle of arrival, angle of departure information, or location information regarding a location of the user device with respect to the at least one wireless network device.

19. The apparatus of claim 16, wherein the at least one processor is configured to monitor whether the user device is in range of a second network device which is configured to communicate with the user device at the high frequency.

20. The apparatus of claim 19, wherein the at least one processor is configured to activate the second network device when the user device is in range of the second network device.

21. The apparatus of claim 20, wherein the at least one processor is further configured to provide, by the at least one network device, the coarse channel properties to the second network device for establishing high frequency communication with the user device.

22. The apparatus of claim 16, further including configuration of the at least one processor to transmit information corresponding to one or more high frequency communication network devices to the user device.

23. The apparatus of claim 16, wherein at least one processor is configured to direct a high frequency transmission beam based on the coarse channel properties identified with regard to the communication at the low frequency.

24. The apparatus of claim 16, wherein the coarse channel properties are identified in accordance with one or more of: transmissions received from the user device, or an independent determination by the at least one wireless network.

25. An apparatus for wireless communication, comprising:
  at least one processor configured to:
    communicate, by a user device, with at least one network device at a low frequency; and
    receive, at the user device, a high frequency communication directed to the user device from the at least one network device based on coarse channel properties associated with the configuration of the at least one processor to communicate at the low frequency, wherein the coarse channel properties associated with the configuration of the at least one processor to communicate at the low frequency are utilized to steer a beam that conveys the high frequency communication toward the user device, wherein the high frequency communication is maintained based on the coarse channel properties associated with the configuration of the at least one processor to communicate at the low frequency that are continually obtained from the communicating at the low frequency to tune the high frequency communication in response to environmental changes; and
  a memory coupled to the at least one processor.

26. The apparatus of claim 25, wherein the low frequency includes at least one of licensed spectrum or unlicensed spectrum;
  wherein high frequency includes at least one of licensed spectrum or unlicensed spectrum; and
  wherein the coarse channel properties associated with the licensed spectrum of the low frequency are used in a direction of the high frequency communication to the user device.

27. The apparatus of claim 25, wherein the configuration of the at least one processor to communicate by the user device with the at least one network device includes configuration of the at least one processor to communicate the coarse channel properties to the at least one network device.

28. The apparatus of claim 25, wherein the coarse channel properties include at least one of: path loss, power delay profile, multipath direction, angle of arrival, angle of departure information, or location information regarding a location of the user device with respect to the at least one wireless network device for the configuration of the at least one processor to communicate at the low frequency between the user device and the at least one network device.

29. The apparatus of claim 25, wherein the at least one processor is configured to receive a second high frequency communication from a second network device different from the at least one network device.

30. The apparatus of claim 29, wherein the at least one processor is configured:
  to transmit and receive control information with the at least one network device at the low frequency; and
  to transmit and receive data information with the second network device with the high frequency communication.

* * * * *